United States Patent [19]
Suzuki et al.

[11] 4,423,937
[45] Jan. 3, 1984

[54] TTL LIGHT MEASURING SYSTEM

[75] Inventors: Ryoichi Suzuki, Kawasaki; Takashi Uchiyama, Yokohama, both of Japan

[73] Assignee: Canon Kabushiki Kaisha, Tokyo, Japan

[21] Appl. No.: 293,405

[22] Filed: Aug. 14, 1981

[30] Foreign Application Priority Data

Aug. 22, 1980 [JP] Japan .................... 55-115411

[51] Int. Cl.$^3$ .............................................. G03B 7/08
[52] U.S. Cl. .................................... 354/446; 354/232; 354/272
[58] Field of Search .................... 354/40, 42, 43, 227, 354/232, 272

[56] References Cited

U.S. PATENT DOCUMENTS

| 3,964,073 | 6/1976 | Kobori et al. | 354/43 |
| 4,054,887 | 10/1977 | Holle et al. | 354/43 |
| 4,074,289 | 2/1978 | Nobusawa | 354/43 |
| 4,096,493 | 6/1978 | Sunouchi et al. | 354/43 |
| 4,322,144 | 3/1982 | Suzuki et al. | 354/43 |

Primary Examiner—Russell E. Adams
Attorney, Agent, or Firm—Toren, McGeady and Stanger

[57] ABSTRACT

In the disclosed light measuring system, light coming from a photographic lens is measured through a momentarily closed diaphragm and memorized to control the diaphragm during a subsequent exposure.

6 Claims, 5 Drawing Figures

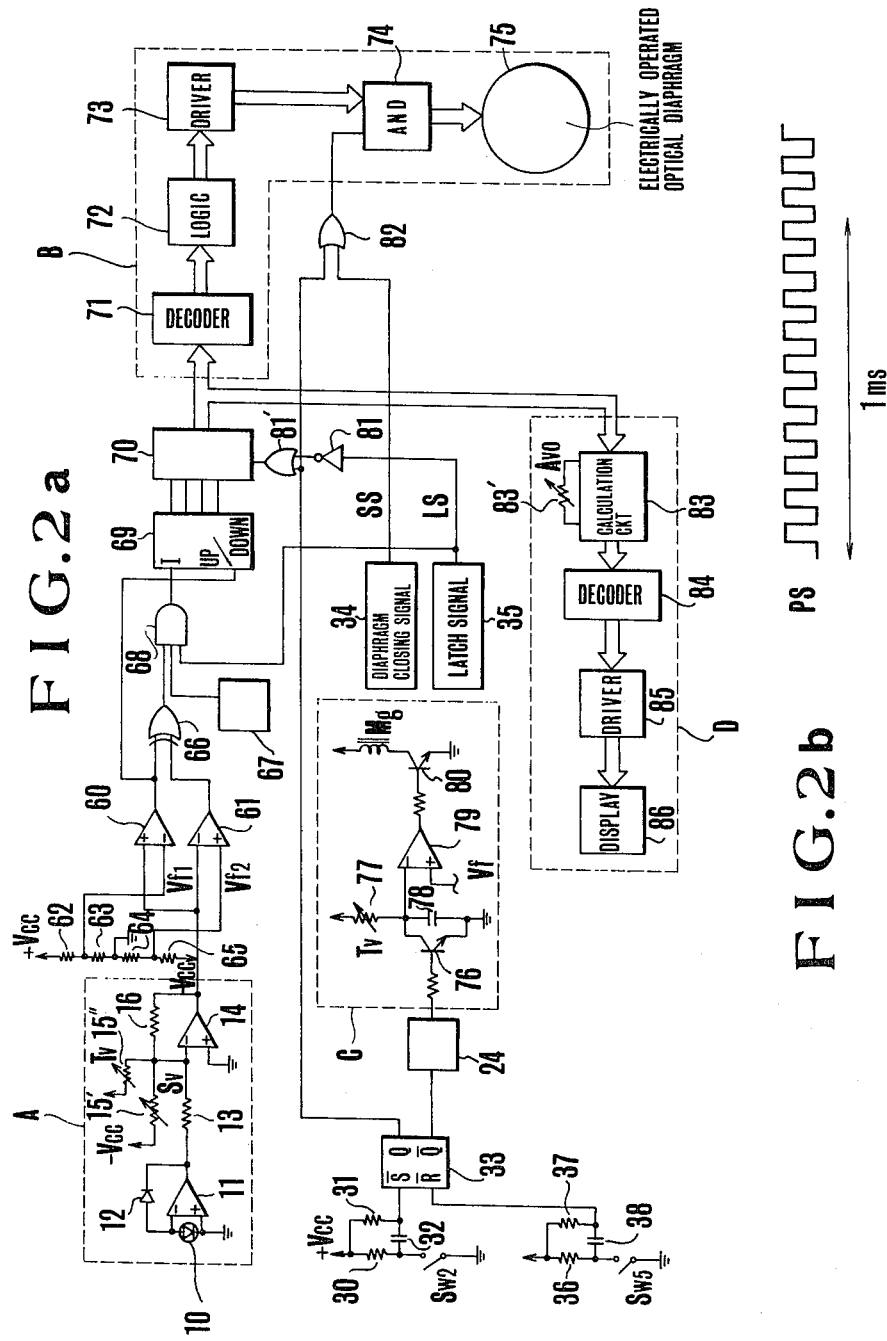

TTL LIGHT MEASURING SYSTEM

BACKGROUND OF THE INVENTION

1. Field of the Invention

This invention relates to a through-the-lens (TTL) light measuring system, particularly one which measures light passing through a closed down diaphragm.

2. Description of the Prior Art

Known single lens reflex cameras utilizing TTL light measuring systems maintain the brightness in the viewfinder during light measurement by measuring with the diaphragm wide open. The exposure is controlled in response to the light measurement value and the diaphragm is closed down only during an exposure so as to dim the viewfinder for as short a time as possible. However, in such conventional TTL wide open light measuring systems, it is necessary, mechanically or electrically, to transmit preset diaphragm information, the lenses vignetting compensation information, or if needed, the smallest F value of the lens, to the camera body. At the same time, a complicated automatic diaphragm mechanism is needed to close the lens diaphragm only at the time the shutter operation. This increases the cost of the camera.

On the other hand, in TTL light measuring systems using closed diaphragms, it is possible to confirm the depth of field and the system can be constructed in a comparatively simple way. However, the viewfinder dims during light measurement. This is inconvenient.

A proposal has been made to eliminate the aforementioned disadvantages with a light measuring system that measures the light immediately after the diaphragm closes in response to the shutter release. However, under thee circumstances, it is not possible to pre-display the light measurement value.

On the other hand, in case of the TTL light measuring system with the closed diaphragm the field depth can be confirmed and the system can be constructed comparatively in a simple way, which is convenient, while the view finder becomes dark at the time of the light measurement, which is inconvenient.

Hereby in order to eliminate the above-mentioned inconvenience a light measuring system with instantly closed diaphragm for measuring the light immediately after closing the diaphragm with the shutter release has been proposed, whereby however, the predisplay of the light measurement value cannot be impossible.

SUMMARY OF THE INVENTION

The above-mentioned inconvenience taken into consideration, it is an object of the present invention to provide a TTL light measurement system in accordance to which the electrically operated optical diaphragm or the electromagnetically driven diaphragm is closed for an instance in accordance with the preset exposure information at the time of the light measurement, the light measurement output in the closed state of the diaphragm is held and the exposure operation is carried out in accordance with the held light measurement output at the time of the shutter release.

It is another object of the present invention to provide a TTL light measurement system in accordance to which the diaphragm is repeatedly closed at the time of the light measurement and the light measurement output is renewed each time.

BRIEF DESCRIPTION OF THE DRAWINGS

FIG. 2(a) shows a second camera light measuring circuit embodying the present invention.

FIG. 2(b) shows the wave-forms of the circuit shown in FIG. 2(a).

DESCRIPTION EMBODYING THE PREFERRED EMBODIMENTS

Below an embodiment of the present invention will be explained in accordance with FIGS. 1(a) and (b).

Figure 1A:
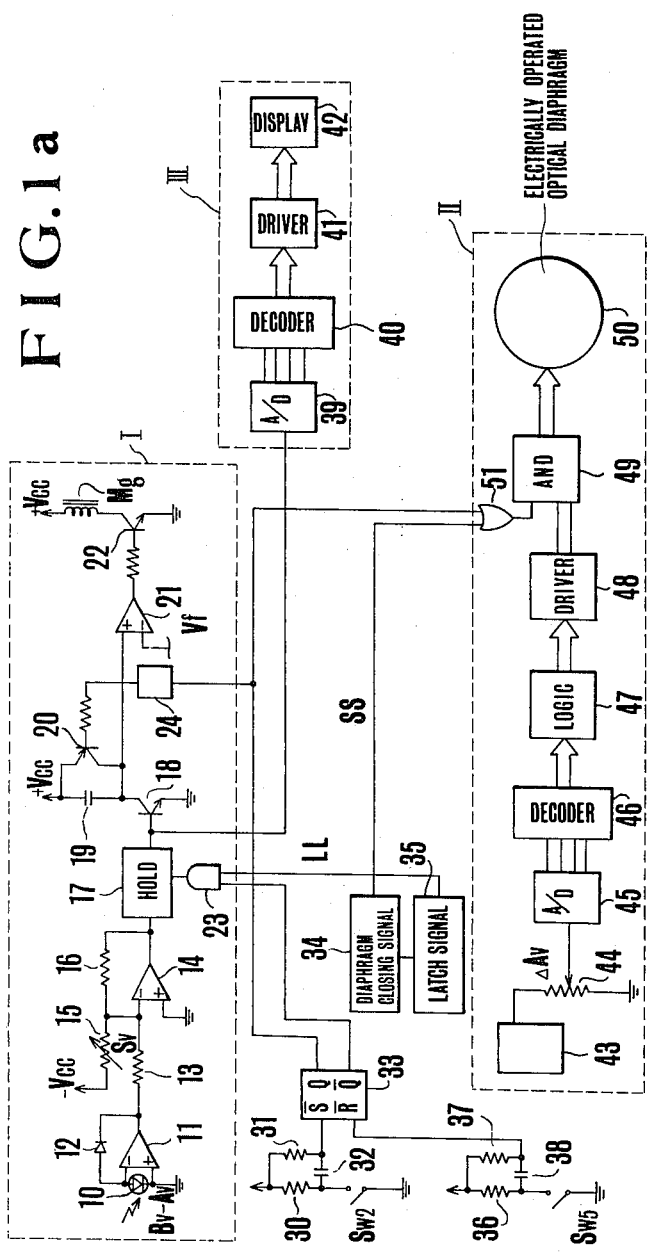
FIG. 1(a) shows a first camera light measuring circuit embodying the present invention.

FIG. 1(a) shows the control circuit of an automatic exposure single lens reflex camera with aperture priority and using an electrically operated optical diaphragm.

The term "electrically operated optical diaphragm" refers to any conventional device whose light permeability varies in response to the effect of electrical potential or magnetic field, as disclosed in U.S. Pat. No. 4,054,890, using, for example, a liquid crystal, an electrooptic element, a light permeable ceramic (PLZT), etc. The greatest merit in an electrically operated optical diaphragm lies in a diaphragm closing operation without movable mechanical members.

FIG. 1(a) includes a light measuring and shutter control circuit I, a diaphragm control circuit II, and a shutter time pre-display circuit III. In the light measuring and shutter control circuit I, a light measuring photo voltaic member in the form of a silicon photo-cell (SPC) measures the light coming from a photographic lens through the diaphragm. An operational amplifier 11 forms the SPC head amplifier and a logarithmically compressing diode 12 provides a negative feedback circuit for the amplifier 11. An operational amplifier 14 forms an adding circuit whose inverting input is connected to the output of the operational amplifier 11 through a resistor 13 as well as to a negative power source −Vcc through a variable resistor 15. The latter enters ASA sensitivity information of the film to be used. A negative feedback resistor 16 is connected across the operational amplifier 14. A sample and hold circuit 17 is connected to the output of the operational amplifier 14 and a logarithmically expanding transistor 18 is connected to the output of the sample and hold circuit. A time constant capacitor connected to the collector of the transistor 18 is also connected parallel to a switching transistor 20 which starts timing. An operational amplifier 21 forms a comparator circuit whose non-inverting input is connected to the collector of the logarithmically extending switching transistor and whose inverting input receives a standard voltage Vf. A switching transistor 22 has a base which receives the output of the operational amplifier 21 through a resistor, and whose collector is connected to an electromagnet Mg that controls the camera's trailing or tail shutter curtain. A two input AND gate 23 is connected to the sample terminal of the sample and hold circuit 17. The output terminal of a delay circuit 24 is coupled to the base of a switching transistor 20 through a resistor.

A switch SW2, to be closed upon shutter release, affects a differentiating circuit composed of resistors 30, and 31 and a capacitor 32.

A switch SW5, to be closed when the trailing shutter curtain has run, affects a differentiating circuit composed of resistors 36 and 37 and a capacitor 38. An RS flip-flop 33 includes a set input terminal connected to the output of the differentiating circuit 30, 31, and 32, and a reset input terminal connected to the differentiating circuit 36, 37, and 38. A diaphragm closing signal producing circuit 34 provides a pulse series SS shown in FIG. 1(b). A latch signal producing circuit 35 produces a pulse series synchronized with the pulse series SS, as shown in LS in FIG. 1(b).

The two inputs of the AND gate 23 are connected respectively to the Q output terminal of the RS flip-flop circuit 33 and the output terminal of the latch signal producing circuit 35. The input terminal of the delay circuit 24 is connected to the Q output terminals of the RS flip-flop circuit 33.

In the diaphragm circuit II, element 43 is a constant voltage producing circuit, 44 is a potentiometer 44 connected to the output terminal of the circuit 43, with the potentiometer 44 is operatively engaged with the preset diaphragm ring at the lens or the preset diaphragm dial at the camera body. An A/D converter converts the input analogue signal into a binary code. Circuit 46 is a decoder for converting the input signal in binary code into a decimal code. Circuit 47 is a logic converting circuit, 48 is the electrically operated optical diaphragm driving circuit, 49 is an AND circuit and 50 is the electrically operated optical diaphragm. Circuit 51 is a 2 input OR gate, with one input connected to the Q output terminal of the RS flip-flop circuit 33 and the other input connected to the output terminal of the diaphragm closing signal producing circuit 34. The output signal of the OR gate 51 is delivered to the AND circuit 49.

In the pre-display circuit III, an A/D converting circuit, 39 has an input terminal connected to the output terminal of the sample and hold circuit 17. Circuit 40 is a decoder connected to the output of the A/D converter 39, 41 is its driving circuit and 42 is a digital display device such as LCD, LED or the like connected to the output of the driving circuit 41, with the display device is arranged in the view finder of the camera.

The current supply to each of the above circuits can be made with the closure of the main switch (not shown in the drawing) of the camera or with the first step of a stroke of the shutter button (not shown in the drawing) of the camera.

The circuits operate as follows:

When, for example, at the first step of a stroke of the shutter button, current is supplied to each circuit, the diaphragm closing signal producing circuit 34 produces a pulse series as SS, which signal is delivered to the AND gate 49 through the OR gate 51.

On the other hand the A/D converter 45 in the diaphragm control circuit II receives an analogue voltage corresponding to the preset aperture value information such that a binary code corresponding to the analogue voltage is produced. The binary code, after being converted by the decoder 46 into a decimal code, is delivered to the logic converting circuit 47 whose logic converted output selectively operates the driving circuit 48 so as to determine the aperture value, and the driving signal is delivered to the AND circuit 49. As explained above, the OR gate 51 delivers the diaphragm closing signal SS, and only when the signal pulse is on the high the AND circuit 49 delivers the driving signal to the electrically operated optical diaphragm 50 so as to close it intermittently for a short time.

When this diaphragm closing operation is carried out, the light passing through the closed electrically operated optical diaphragm strikes the light measuring SPC 10 in the light measuring and shutter control circuit I. Thus, the SPC head amplifier 11 produces an analogue voltage corresponding to (Bv−Av) represented in APEX. Here, Bv is the brightness information and Av is the aperture information. The analogue voltage is calculated with the ASA sensitivity information Sv of the film in the adding operational amplifier 14 in the next step, which produces Tv=Bv−Av+Sv, namely the analogue voltage corresponding to the APEX value of the shutter time to be controlled.

At this time, the RS flip-flop circuit 33 is not set and its $\overline{Q}$ output is high. Thus, the AND gate 23 delivers the latch signal LS. As explained above, the latch signal LS is synchronized with the diaphragm closing signal SS, and the light measurement output Tv when the diaphragm is closed is held in the sample and hold circuit 17. The held analogue output Tv is delivered to the A/D converter 39 in the pre-display circuit III so as to be converted into a binary code and then to the decoder 40 in the next step so as to be converted into a decimal code. The latter selectively operates the driving circuit 41 in the next step, and the digital display device in the next step is selectively lit by the driving signal so as to display the shutter time to be controlled.

Operation of the shutter button release the blocking mechanism not shown, to start the mirror-up operation, while the switch SW2 is closed. Hence, the differentiating circuit (30, 31, 32) produces a negative differentiated pulse which sets the RS flip-flop circuit 33 so its Q output is inverted to high. Now disregarding the level of the diaphragm closing signal the level of the output of the OR gate 51 becomes high and the AND circuit 49 delivers the driving signal so as to close the electrically operated optical diaphragm 50.

Further, when the RS flip-flop circuit 33 is set, the level of its $\overline{Q}$ output is inverted; low, so the AND gate 23 is closed and then regardless of the level of the latch signal LS the level of its output remains low, so that the output of the sample and hold circuit 17 maintains the former state.

Further, when the level of the Q output of the RS flip-flop circuit 33 is inverted into the high level, the level of the output of the delay circuit 24 is also inverted into the high level at the time point at which the leading shutter curtain starts to run. Hence the switching transistor 20 for timing is switched-off, while the time constant capacitor 19 is charged with the logarithmically extended current of the output voltage (Tv) of the hold circuit 17. As soon as the charged voltage reaches a certain predetermined value, the level at the non-inverting input of the comparator circuit 21 becomes lower than that at the inverting input and the level of its output is inverted to low. The switches off the switching transistor 22 in the next step so as to interrupt the current supply to the magnet Mg for controlling the tail shutter curtain. Hence, the tail shutter curtain starts to run. When the tail shutter curtain has run and the shutter operation has been finished, the switch SW5 is closed and the differentiating circuit (36, 37, 38) produces a negative differentiated pulse, and the RS flip-flop circuit 33 is reset thereby, and the level of its Q output is inverted to low. Thus, the level of the output of the OR gate 51 in the diaphragm control circuit becomes low and the AND circuit 50 stops delivering the driving signal output, and the electrically operated optical diaphragm resumes the totally opened state.

As explained above, in accordance with the present invention by closing the electrically operated optical diaphragm momentarily at the time of the light measurement the light passing through the closed diaphragm is measured in such a manner that the light measurement value is held so as to control the shutter, while the light measurement value is displayed. In case of the present embodiment as can be understood from the duty ratio of the diaphragm closing signal SS the diaphragm closing time at the time of the light measurement is so short that the brightness in the view finder is hardly influenced.

Preferably the electrically operated optical diaphram of the present invention uses elements such as the light permeable ceramic (PLZT) or electrooptical member whose response is comparatively quick.

Below, the second embodiment of the present invention will be explained in accordance with FIGS. 2(a) and (b).

FIG. 2(a) shows a control circuit for the automatic exposure single lens reflex camera with priority on the shutter time, using an electrically operated optical diaphragm made use of.

In FIG. 2(a), A circuit is the light measurement calculation circuit, B is the diaphragm control circuit, C is the shutter control circuit and D is the aperture value pre-display device. In the circuit A, members 10–14 and 16 are the same as those with the same figures in FIG. 1, so that their explanations are omitted. Member 15' is a variable resistor for setting the ASA sensitivity information of the film to be used, and 15" is a variable resistor for setting the shutter time information. Operational amplifiers 60 and 61 form a comparator circuit wherein the non-inverting input terminal of the operational amplifier 60 and the inverting input terminal of the operational amplifier 61 are connected to the output terminal of the operational amplifier 14. Series connected voltage dividing resistors 62 to 65 have the connecting point of the resistors 63 and 64 grounded, that of the resistors 62 and 63 connected to the inverting input terminal of the operational amplifier 60 to deliver a voltage level $Vf_1$, and that of the voltage dividing resistors 64 and 65 connected to the inverting input terminal of the operational amplifier 61 to deliver a voltage level $Vf_2$.

An exclusive OR gate 66 has two inputs connected respectively to the outputs of operational amplifiers 60 and 61. A pulse producing circuit 67 produces a high speed pulse seris PS shown in FIG. 2(b). A three input AND gate 68 has one input terminal connected to the output terminal of the exclusive OR gate 66 and another input terminal connected to the output terminal of the pulse producing circuit 67. The input terminal of an up-down counter 69 receives the output signal of the AND gate 68 and includes an up-down terminal which receives the output of the operational amplifier 60. A latch circuit 70 is connected to the output terminal of the counter 69. In the diaphragm control circuit B, a decoder 71 receives the output signal of the latch circuit 70 and applies its output to a logic converter 72. An electrically operated optical diaphragm driving circuit 73 is connected to the output of the decoder 74 and has an output connected to an AND circuit 73. An electrically operated optical diaphragm 75 responds to the AND circuit 74.

Figure 1B:
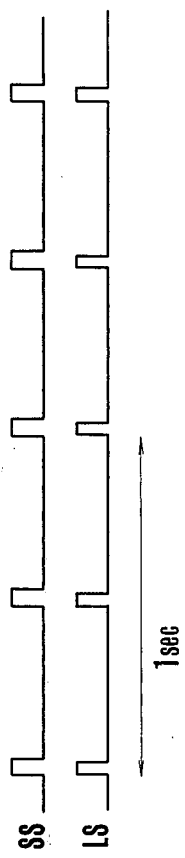
FIG. 1(b) shows the wave-forms of the circuit shown in FIG. 1(a).

A diaphragm closing signal producing circuit 34 produces the pulse series SS as shown in FIG. 1(b), while a latch signal producing circuit 35 generates latch signals in the form of a pulse series LS as shown in FIG. 1(b) and delivers these latch signals to another input of the AND gate 68 as well as to an OR gate 81' through an inverter 81. The output signal of the gate 81' is delivered to the latch signal terminal of the latch circuit 70. A two input OR gate 82 receives the output signal of the diaphragm closing signal producing circuit 34 at one of its terminals.

As in FIG. 1(a), the switch SW2 is closed in response to the shutter release operation and resistors 30 and 31 form a differentiating circuit with the capacitor 32. The switch SW5 is closed when the tail or trailing shutter curtain has run and resistors 36 and 37 form a differentiating circuit with the capacitor 38. The set input terminal of the RS flip-flop circuit 33 receives the output signal of the differentiating circuit 30, 31, 32, while its reset input terminal receives the output of the differentiating circuit 36, 37, and 38. The delay circuit 24 is connected to the Q output of the RS flip-flop 33. In the shutter control circuit C, the base of a switching transistor 76 receives the output of the delay circuit 24. A variable resistor 77 serves for setting the preset shutter time information and is connected to a time constant capacitor which is in turn parallel to the switching transistor 76. An operational amplifier 79 forms a comparator circuit whose inverting input terminal is connected to the voltage dividing point of the variable resistor 77 and the time constant capacitor 78, and whose non-inverting input terminal receives the standard voltage Vf. The base of a switching transistor 80 is connected to the output of the operational amplifier 79 through a resistor, and its collector is connected to an electromagnet Mg for controlling the trailing or tail shutter curtain.

In the pre-display circuit D, a digital calculation circuit 83 receives the output of the latch circuit 70. A variable resistor 83' serves for setting the smallest F value information of the lens. A decoder 84 connected to the output terminal of the calculation circuit 83 is in turn connected to a driver 85 which in turn is coupled to a digital display device using LEDs, LCDs or the like.

The circuit is constructed so that in the shutter time priority mode, the aperture value is calculated by measuring light through the actually closed diaphragm in the way of a servo-system.

Specifically, in the same way as in case of the above embodiment, the electrically operated optical diaphragm 75 is closed until the level of the output signal of the operational amplifier 14 in the light measurement calculation circuit A becomes zero when the diaphragm is instantly closed at the time of light measurement, while the aperture value is held in the latch circuit 70 and displayed, so that the diaphragm is controlled with this value at the time of shutter release.

When the power is supplied to each circuit with the first step of a stroke of the shutter button, not shown in the drawing, the diaphragm closing signal producing circuit 34 produces the diaphragm closing signal SS, which is delivered to the AND circuit 74 through the OR gate 82.

Because the decoder 71 in the diaphragm control circuit B receives the binary code of the aperture value held in the latch circuit 70, the binary code is converted by means of the decoder 71 into a decimal code, which is again converted correspondingly by means of the logic converting circuit 72 in a logic way, so that by means of the logic converted output the driving circuit 73 in the next step to produce a driving signal to be delivered to the AND circuit 74. As mentioned above, the OR gate 82 delivers the diaphragm closing signal SS, and while the level of the signal SS is high, the AND circuit 74 delivers the driving signal to the electrically operated optical diaphragm 75 to close it.

The light measuring element (SPC) 10 in the light measuring calculation circuit A receives the light passing through the electrically operated optical diaphragm in the closed state. Thus, the SPC head amplifier 11 produces an analogue voltage corresponding to (Bv−Av) in APEX. The analogue voltage is calculated with the preset shutter time information (Tv) and the ASA sensitivity information (Sv) of the film by means of the calculation operational amplifier 14 in the next step so as to produce an analogue voltage corresponding to:

$$(Bv - Av) - Tv + Sv = 0.$$

Specifically the aperture value gives a proper exposure, the level of the output of the operational amplifier 14 is zero. Now, let us suppose that the aperture value gives a smaller exposure value than the proper one. In this case, the level of the output of the operational amplifier 14 is positive. When the level of the output is higher than that of the inverted input $Vf_1$ of the operational amplifier 60, the level of the output of the operational amplifier 60 is high. When the level of the output of the operational amplifier 61 is low, the level of the output of the exclusive OR gate 66 is high. Because the level of the latch signal LS is high when the diaphragm is closed, the AND gate 68 is opened and delivers a high speed pulse series from the pulse producing circuit 67 as shown in FIG. 2(b). Because, as mentioned above, the level of the operational amplifier 60 is high, the up down counter 69 counts up the input pulse series PS. Thus, the binary output code of the up counter 69 is increased, and the electrically operated optical diaphragm 75 is closed down by means of the operation as mentioned above.

When on the other hand, the aperture value gives larger exposure value than the proper one, the level of the output of the operational amplifier 14 is negative. When the level is lower than the level of the non-inverted input $Vf_2$ of the operational amplifier 61, the level of the output of the operational amplifier 61 is high and when the level of the operational amplifier 60 is low, the up down counter 69 counts down the input pulse series PS, and the electrically operated optical diaphragm 75 is opened wider by means of the above-mentioned operation. When the aperture value of the electrically operated optical diaphragm gives a proper exposure value, the level of the output of the operational amplifier 14 in the light measuring circuit A becomes zero, so that the level of the output of both the operational amplifiers 60 and 61 is low and thus the level of the output of the exclusive OR gate 66 is also low. Thus, even when the level of the latch signal LS is high the level of the output of the AND gate 68 is low. This interrupts, the pulse signal PS to be delivered to the up down counter 69, while the output of the latch circuit 70 is kept in the previous state so that the electrically operated optical diaphragm keeps the previous aperture value. A non-sensitive range is provided between the levels $Vf_1$ and $Vf_2$.

As explained above, while the level of the latch signal LS is high, the output state of the up down counter 69 varies so that the electrically operated optical diaphragm 75 assumes a proper aperture value. Further, the output of the up down counter 69 which gives a proper aperture value is kept in the latch circuit 70 in the next step while the level of the latch signal LS is low. This is so even when the level of the latch signal is low, because the output of the inverting circuit 81 is high and the latch input terminal of the latch circuit 70 is high.

This held 2 digitalized signal ($\Delta Av$) is delivered to the calculation circuit 83 in the predisplay circuit D to be calculated with the smallest F value so as to produce a 2 digitalized signal corresponding to the absolute value (Av) of the aperture value at the output. This 2 digitalized signal is converted with the decoder 84 in the next step into a decimal code, in accordance with which decimal code the driver 85 is operated, and the digital display device 86 displays the absolute value of the aperture value.

Below, the operation at the time of the shutter release will be explained.

When the switch SW2 is closed along with the shutter release operation the differentiating circuit (30, 31, 32) produces a negative differentiated pulse. The RS flip-flop circuit 33 is set by means of the pulse, and the level of the Q output is high. Thus, the level of the output of the OR gate 81' is also high so as to self-hold the previous output state of the latch circuit 70. Further, the level of the output of the OR gate 82 is also high, so that a driving signal is delivered from the AND circuit 74 to the electrically operated optical diaphragm so that the diaphragm assumes the closed state in accordance with the output state of the latch circuit 70.

When the RS flip-flop circuit 33 is set, the level of the $\overline{Q}$ output of the circuit 33 is inverted to low and a little later the level of the output of the delay circuit 24 is also inverted to low, so that the switching transistor 76 is switched-off and the time constant capacitor 78 starts charging through the variable resistor 77 for setting the preset shutter time information. As soon as the charge level reaches a predetermined value, the level of the output of the operational amplifier 79 is inverted to the low level. The current supply to the magnet for controlling the tail shutter curtain is interrupted, when the tail shutter curtain starts to run. When the tail shutter curtain has run and the switch SW5 is closed, the differentiating circuit (36, 37, 38) produces a negative differentiated pulse, by means of which pulse the RS Flip-Flop circuit is reset, so that the level of the Q output becomes low. Thus, the level of the output of the OR gate 82 becomes low and the AND circuit 74 is closed so that the driving signal is not transmitted. Hence, the electrically operated optical diaphragm 75 resumes the totally opened state.

Below, the third embodiment of the present invention is explained in connection with FIG. 3.

Figure 3:
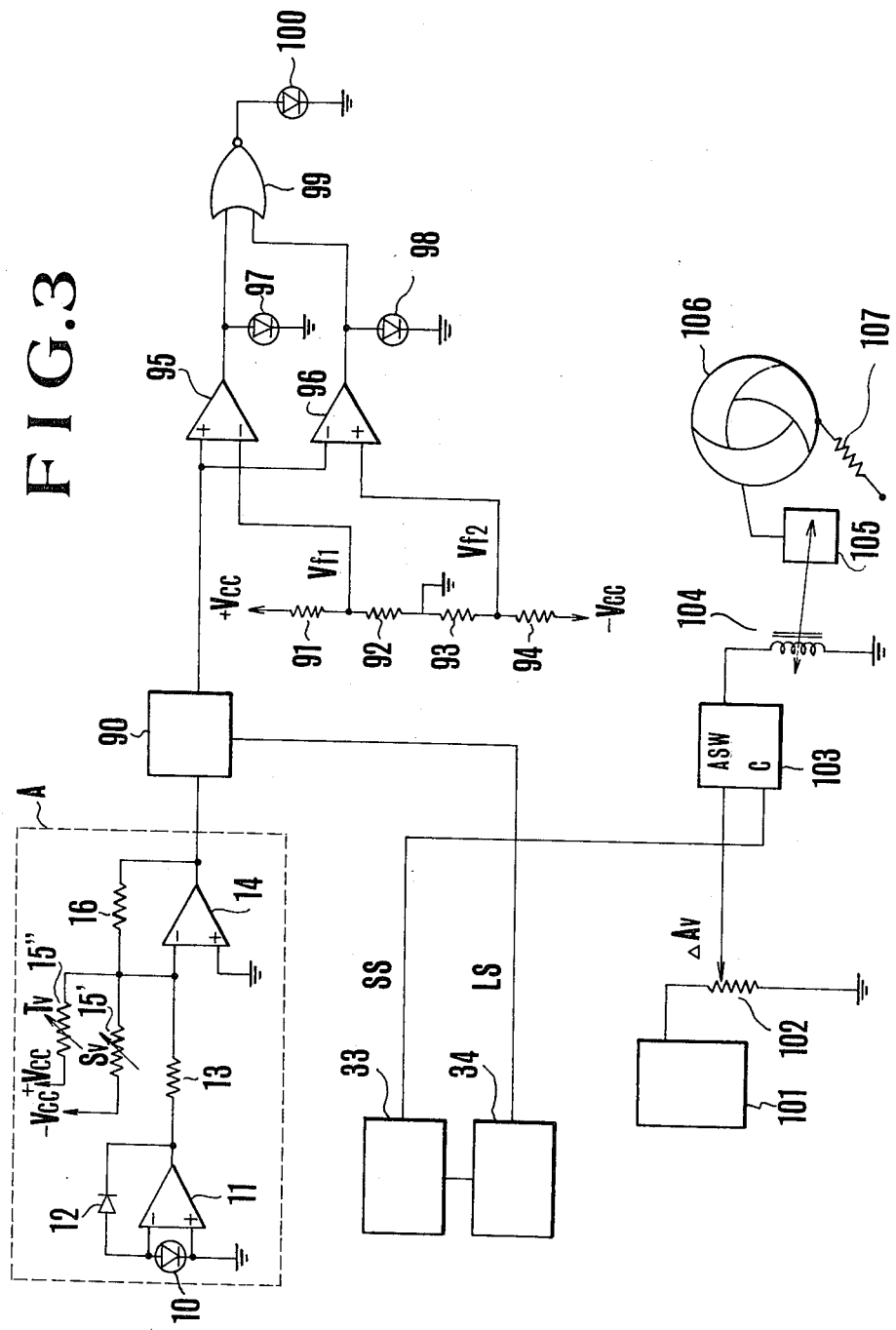
FIG. 3 shows a third camera light measuring circuit of the present invention.

FIG. 3 shows the control circuit for single lens reflex cameras using an electromagnetically driven diaphragm.

In FIG. 3, members in the light measuring circuit A having the same reference numerals as those in FIG. 2(a) represent the same members. FIG. 3 includes a sample and hold circuit 90, voltage dividing resistors 91 to 94 connected in series, with the connecting point of the resistors 92 and 93 grounded. Operational amplifiers 95 and 96 form comparator circuits. The non-inverting input terminal of the operational amplifier 95 and the inverting input terminal of the operational amplifier 96 receive inputs from the sample and hold circuit 90. The inverting input terminal of the operational amplifier 95 is connected to the connecting point, exhibiting the voltage $Vf_1$, of the voltage dividing resistors 91 and 92, and the non-inverting input terminal of the operational amplifier 96 is connected to the connecting point of the voltage dividing resistors 93 and 94. The latter exhibit the voltage level $Vf_2$.

A light emitting diode 97 is connected to the output of the operational amplifier 95 to display that the set exposure value is high. A light emitting diode 98 is connected to the output of the operational amplifier 96 for displaying that the set exposure value is low. A NOR gate 99 whose two inputs are connected respectively to the outputs of operational amplifiers 95 and 96 actuates a light emitting diode 100 when the set exposure value is correct.

The diaphragm closing signal producing circuit 33 and the latch signal producing circuit 34 operate in the same way as in FIG. 1(a). The output of the latch signal producing circuit 34 is connected to the sample terminal of the sample and hold circuit 90. A constant voltage producing circuit 101 energizes a potentiometer 102 which sets the diaphragm closing step number $\Delta Av$. The output of the potentiometer is connected to the analogue switch 103.

The diaphragm closing signal SS is delivered to the control terminal C of the analogue switch 103, whose output is connected to the coil of the electromagnetically driven diaphragm. A motor 105 drives the electromagnetically driven diaphragm, with a diaphragm blade 106 biased by a return spring 107.

The operation of the circuit above is as follows.

As long as the level of the diaphragm closing signal SS is high, the analogue switch is closed so as to deliver an analogue voltage corresponding to the information of the diaphragm closing step number, and the current corresponding to the analogue voltage runs through the coil. The force corresponding to the current drives the diaphragm blade 106 is into a position at which the force is in balance with the strength of the return spring 107, so that the diaphragm is closed in a desired way. When the level of the diaphragm closing signal SS resumes the low level, the analogue switch 103 is opened so as to interrupt the current supply to the coil 104, so that the returning force of the spring 107 causes the diaphragm blade 106 resume the totally opened state. As explained above, the electromagnetically driven diaphragm is closed instantly. The ouput of the light measurement calculation circuit A in the closed state of the diaphragm is held in the sample and hold circuit 90 in the next step. In case the set value of the Tv and $\Delta Av$ informations are proper the level of the output of the operational amplifier 14 in the light measurement calculation circuit A is zero, whereby the level of the holding force of the sample and hold circuit 90 is also zero. Thus, the level of each output of the operational amplifiers 95 and 96 is zero, so that the light emitting diodes 97 and 98 do not light. Now the level of the output of the NOR gate 99 is high so that the light emitting diode 100 lights to display that the set exposure value is proper.

When the set exposure value is too high, the level of the output of the sample and hold circuit 90 is positive. When the level is higher than the level $Vf_1$, the level of the output of the operational amplifier 95 is high, while the level of the output of the operational amplifier 96 is low so that the level of the output of the NOR gate 99 is low. Hence only the light emitting diode 97 lights so as to display that the set aperture value is too high.

When the set exposure amount is too low, the level of the output of the sample and hold circuit 90 is negative. When the level of the output is lower than $Vf_2$ the level of the output of the operational amplifier 95 goes low, while that of the output of the operational amplifier 96 goes high so that only the light emitting diode 98 lights. Thus, the photographer reset Tv and $\Delta Av$ until the light emitting diode 100 lights.

As explained above in accordance with the embodiments of the present invention, a diaphragm device such as the electrically operated optical diaphragm, or the electromagnetically operated diaphragm whose response is very excellent, measures the light passing through the actually closed diaphragm without affecting the brightness of the view finder, and permits display of the light measurement. Also, a mechanism for transmitting various information from the interchangeable lens to the camera body becomes unnecessary, which enables the realization of a compact device.

Further, because the light passing through the actually closed diaphragm is measured, the irregularity of the permeability of the electrically operated optical diaphragm and the influence due to the temperature can automatically be compensated. Further, it is not necessary to compensate the vignetting effect of the lens.

As explained above in detail, the present invention is remarkably effective for not only a single reflex camera but also the camera to which the TTL light measuring system can be applied.

What is claimed is:

1. A TTL light measuring system for a camera comprising:
 a diaphragm;
 diaphragm control means for effecting stop down of said diaphragm in response to a driving signal applied thereto;
 a release button settable to a first step for actuating a light measuring operation and to a second step for actuating a release operation of the camera;
 first signal producing means for producing a pulse signal as the driving signal to actuate the diaphragm control means for stopping down the diaphragm for only a short period of time before a release operation of the camera, said first signal producing means being arranged to be actuated for producing the pulse signal at the first step of the release button;
 light measuring means for measuring light from an object passing through the diaphragm;
 holding means for storing at light measuring output of the light measuring means and producing a holding signal as an exposure signal, said holding means being arranged for storing the output of the light measuring means measuring the object light passing through the diaphragm which has been stopped down when the pulse signal is applied thereto; and
 second signal producing means for producing a release signal for effecting a release operation of the camera, said second signal producing means being actuated for producing the release signal at the second step of the release button.

2. A TTL light measuring system in accordance with claim 1, wherein the diaphragm is an electrically operated optical diaphragm.

3. A TTL light measuring system in accordance with claim 1, wherein the first signal producing means is arranged for producing a pulse series signal to intermittently operate the diaphragm control means and the holding means.

4. A TTL light measuring system in accordance with claim 1, further comprising display means for displaying the signal held by the holding means.

5. For a camera with a diaphragm and a shutter release wherein the shutter release is actuable to a first light measuring position and a second shutter actuating position,
   a light measuring arrangement for measuring light through the diaphragm;
   signal holding means for holding the measurement of the measure arrangement; and
   circuit means responsive to the shutter release and connected to said holding means and said diaphragm control circuit for momentarily actuating the diaphragm control circuit and initiating operation of said holding means in response to the shutter release being in the first light measuring position and for reactuating said diaphragm control circuit and reading out the content of said holding means in response to the shutter release being in the second shutter actuating position.

6. A TTL light measuring system for a camera comprising:
   a diaphragm;
   diaphragm control means for effecting a stop down of the diaphragm in response to a driving signal applied thereto;
   a release button settable to a first step for actuating a light measuring operation and a second step is for actuating a release operation of the camera;
   first signal producing means for producing a pulse signal as the driving signal to cause the diaphragm control means to stop down the diaphragm for only a short period of time before a release operation of the camera, said first signal producing means being arranged to be actuated to produce the pulse signal at the first step of the release button;
   light measuring means for measuring light from an object passing through the diaphragm;
   holding means for holding a light measuring output of the light measuring means and producing a holding signal to serve as an exposure signal, said holding means being arranged for holding the output of the light measuring means measuring light passing through the diaphragm which has been stopped down when the pulse signal is applied thereto;
   shutter control means for effecting a shutter control correspondence to the exposure signal from the holding means, said shutter control means being actuated by a release signal; and
   second signal producing means for producing a release signal for effecting a release operation of the camera, said second signal producing means being arranged to be actuated at the second step of the release button for producing the release signal which is used as the driving signal to actuate the diaphragm control means.

* * * * *